US012739630B2

(12) United States Patent
Suyama et al.

(10) Patent No.: US 12,739,630 B2
(45) **Date of Patent: *Sep. 15, 2026**

(54) RELAY DEVICE AND VEHICLE COMMUNICATION METHOD

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yojiro Suyama, Osaka (JP); Yasuhiro Yabuuchi, Yokkaichi (JP); Darmawan Go, Yokkaichi (JP); Yosuke Shimizu, Yokkaichi (JP); Takeshi Hagihara, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/781,541

(22) Filed: Jul. 23, 2024

(65) Prior Publication Data

US 2024/0381084 A1 Nov. 14, 2024

Related U.S. Application Data

(63) Continuation of application No. 17/624,784, filed as application No. PCT/JP2020/022988 on Jun. 11, 2020, now Pat. No. 12,395,840.

(30) Foreign Application Priority Data

Jul. 5, 2019 (JP) ................................ 2019-126255

(51) Int. Cl.
*H04W 12/06* (2021.01)
*G07C 5/00* (2006.01)
(Continued)

(52) U.S. Cl.
CPC ........... *H04W 12/06* (2013.01); *G07C 5/008* (2013.01); *H04W 4/40* (2018.02); *H04W 76/10* (2018.02)

(58) Field of Classification Search
CPC ....... H04W 12/06; H04W 4/40; H04W 76/10; G07C 5/008
See application file for complete search history.

(56) References Cited

U.S. PATENT DOCUMENTS

2002/0146002 A1 10/2002 Sato
2007/0185624 A1 8/2007 Duddles et al.
(Continued)

FOREIGN PATENT DOCUMENTS

CN 102333118 A 1/2012
CN 106961437 A 7/2017
(Continued)

OTHER PUBLICATIONS

Feb. 26, 2025 Notice of Allowance issued in U.S. Appl. No. 17/615,174.
(Continued)

*Primary Examiner* — Frantz B Jean
(74) *Attorney, Agent, or Firm* — Oliff PLC

(57) ABSTRACT

Provided is a relay device mounted to a vehicle including a plurality of function units. The relay device includes: an authentication processing unit configured to acquire authentication information of a function unit from an external device outside the vehicle, and perform an authentication process regarding the function unit by using the acquired authentication information; and a relay processing unit con-
(Continued)

figured to, on the basis of a result of the authentication process performed by the authentication processing unit, relay information between the function unit and another function unit. When a validity time limit of the authentication information has expired, the authentication processing unit acquires, from the external device, the authentication information that is new.

8 Claims, 9 Drawing Sheets

(51) Int. Cl.
*H04W 4/40* (2018.01)
*H04W 76/10* (2018.01)

(56) References Cited

U.S. PATENT DOCUMENTS

| | | | | |
|---|---|---|---|---|
| 2008/0059806 | A1 | 3/2008 | Kishida et al. | |
| 2010/0002710 | A1 | 1/2010 | Isoyama | |
| 2010/0302974 | A1 | 12/2010 | Niiyama et al. | |
| 2010/0313242 | A1 | 12/2010 | Sato | |
| 2012/0054835 | A1 | 3/2012 | Oda et al. | |
| 2012/0277949 | A1 | 11/2012 | Ghimire et al. | |
| 2013/0010640 | A1 | 1/2013 | Higuchi et al. | |
| 2014/0068099 | A1* | 3/2014 | Komori | H04L 45/745 709/236 |
| 2015/0145648 | A1 | 5/2015 | Winkelman | |
| 2015/0172298 | A1 | 6/2015 | Otsuka | |
| 2016/0315766 | A1 | 10/2016 | Ujiie et al. | |
| 2016/0373449 | A1 | 12/2016 | Haga et al. | |
| 2017/0134164 | A1 | 5/2017 | Haga et al. | |
| 2017/0352210 | A1* | 12/2017 | Maiwand | G07C 9/00571 |
| 2018/0009446 | A1* | 1/2018 | Ricci | G07B 15/063 |
| 2018/0077062 | A1 | 3/2018 | Park et al. | |
| 2018/0115490 | A1* | 4/2018 | Kawasaki | H04L 47/2441 |
| 2018/0367546 | A1 | 12/2018 | Miyashita | |
| 2019/0044730 | A1 | 2/2019 | Woo et al. | |
| 2019/0173912 | A1 | 6/2019 | Ujiie et al. | |
| 2019/0197468 | A1* | 6/2019 | Endo | G06Q 10/0832 |
| 2019/0334897 | A1 | 10/2019 | Anzai et al. | |
| 2019/0356608 | A1 | 11/2019 | Tanaka et al. | |
| 2019/0394065 | A1 | 12/2019 | Okubo et al. | |
| 2020/0029213 | A1* | 1/2020 | Nölscher | B60R 25/24 |
| 2020/0084025 | A1 | 3/2020 | Ujiie et al. | |
| 2020/0106704 | A1 | 4/2020 | Iwata et al. | |
| 2020/0137049 | A1 | 4/2020 | Ogawa et al. | |
| 2020/0220716 | A1 | 7/2020 | Haga et al. | |
| 2020/0366529 | A1* | 11/2020 | Park | H04L 69/22 |
| 2021/0028925 | A1 | 1/2021 | Ujiie et al. | |
| 2021/0329002 | A1* | 10/2021 | Huh | G06F 21/32 |

FOREIGN PATENT DOCUMENTS

| | | | |
|---|---|---|---|
| CN | 108881247 | A | 11/2018 |
| JP | 2002-314573 | A | 10/2002 |
| JP | 2003-046536 | A | 2/2003 |
| JP | 2003-244185 | A | 8/2003 |
| JP | 2008-059450 | A | 3/2008 |
| JP | 2010-183204 | A | 8/2010 |
| JP | 2010-283607 | A | 12/2010 |
| JP | 2013-017021 | A | 1/2013 |
| JP | 2013-193598 | A | 9/2013 |
| JP | 2016-127299 | A | 7/2016 |
| JP | 2016-134170 | A | 7/2016 |
| JP | 2016-152429 | A | 8/2016 |
| JP | 2017-005617 | A | 1/2017 |
| JP | 2017-059210 | A | 3/2017 |
| JP | 2017-212728 | A | 11/2017 |
| JP | 2017-220220 | A | 12/2017 |
| JP | 2018-117254 | A | 7/2018 |
| JP | 2018113505 | A | 7/2018 |
| JP | 2018-152758 | A | 9/2018 |
| JP | 2018-174481 | A | 11/2018 |
| JP | 2018-192876 | A | 12/2018 |
| JP | 2019-016247 | A | 1/2019 |
| WO | 2013/161873 | A1 | 10/2013 |
| WO | 2016/075865 | A1 | 5/2016 |
| WO | 2016/075869 | A1 | 5/2016 |
| WO | 2016/204081 | A1 | 12/2016 |

OTHER PUBLICATIONS

May 15, 2025 Notice of Allowance received in U.S. Appl. No. 18/403,973.
May 20, 2025 Notice of Allowance Issued in U.S. Appl. No. 17/612,136.
May 21, 2025 Notice of Allowance received in U.S. Appl. No. 17/624,784.
U.S. Appl. No. 19/214,569, filed May 21, 2025 in the name of Yamamoto.
Oct. 23, 2024 Office Action issued in U.S. Appl. No. 17/615,174.
Oct. 28, 2024 Notice of Allowance issued in U.S. Appl. No. 17/624,784.
Sep. 29, 2024 Office Action issed in U.S. Appl. No. 17/612,136.
Dec. 9, 2024 Notice of Allowance issued in U.S. Appl. No. 18/403,973.
Jan. 10, 2025 Ex Parte Quayle Action issued in U.S. Appl. No. 17/615,174.
Jan. 27, 2025 Notice of Allowance issued in U.S. Appl. No. 17/612,136.
The U.S. Appl. No. 17/615,174, filed Nov. 30, 2021 in the name of Yusuke Yamamoto et al.
The U.S. Appl. No. 17/622,892, filed Dec. 27, 2021 in the name of Yojiro Suyama et al.
The U.S. Appl. No. 17/612,136, filed Nov. 17, 2021 in the name of Yusuke Yamamoto et al.
Feb. 15, 2023 Office Action issued in U.S. Appl. No. 17/622,892.
Mar. 16, 2023 Office Action Issued In U.S. Appl. No. 17/615,174.
Jun. 28, 2023 Office Action issued in U.S. Appl. No. 17/622,892.
Sep. 7, 2023 U.S. Office Action issued U.S. Appl. No. 17/615,174.
Oct. 20, 2023 Notice of Allowance issued in U.S. Appl. No. 17/622,892.
Jan. 4, 2024 U.S. Office Action issued in U.S. Appl. No. 17/612,136.
The U.S. Appl. No. 17/612,136, filed Mar. 10, 2020 in the name of Yusuke Yamamoto et al.
Jan. 24, 2024 Office Action issued in U.S. Appl. No. 17/624,784.
Apr. 10, 2024 Office Action issued in U.S. Appl. No. 17/615,174.
Apr. 15, 2024 Office Action issued in U.S. Appl. No. 17/612,136.
U.S. Appl. No. 18/403,973 in the name of Suyama.
Apr. 26, 2024 Notice of Allowance issued in U.S. Appl. No. 17/622,892.
Feb. 4, 2025 Notice of Allowance issued in U.S. Appl. No. 17/624,784.

* cited by examiner 100
110
COMMUNICATION UNIT
120
RELAY PROCESSING UNIT
130
DETECTION UNIT
140
AUTHENTICATION PROCESSING UNIT
150
STORAGE UNIT
160A
TIMER
160B
TIMER
160C
TIMER
160D
TIMER
52A
52B
52C
52D
TCU 200A
IN-VEHICLE ECU 200B
IN-VEHICLE ECU 200C

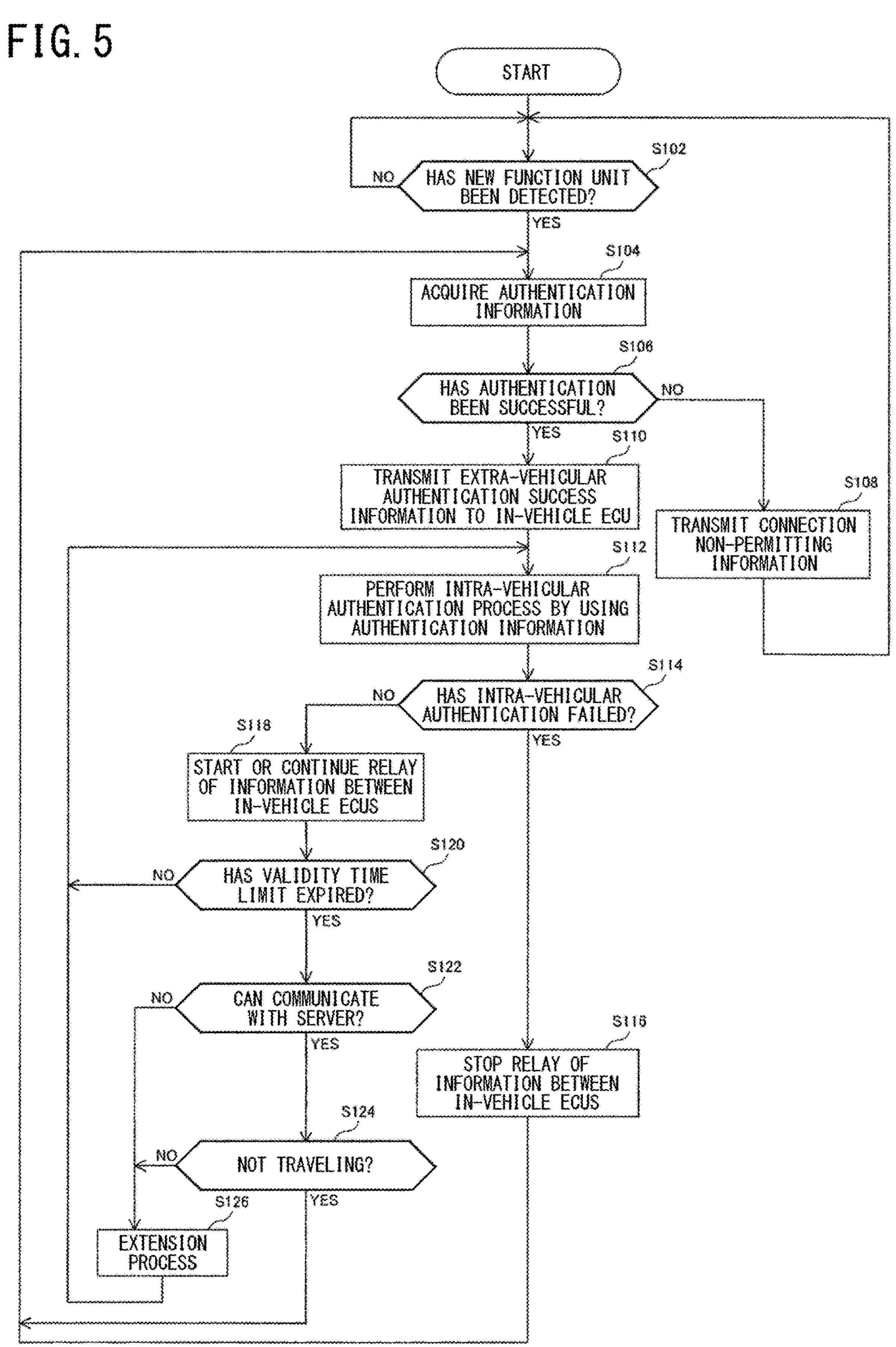
FIG. 5
START
S102
HAS NEW FUNCTION UNIT BEEN DETECTED?
NO
YES
S104
ACQUIRE AUTHENTICATION INFORMATION
S106
HAS AUTHENTICATION BEEN SUCCESSFUL?
NO
YES
S110
TRANSMIT EXTRA-VEHICULAR AUTHENTICATION SUCCESS INFORMATION TO IN-VEHICLE ECU
S108
TRANSMIT CONNECTION NON-PERMITTING INFORMATION
S112
PERFORM INTRA-VEHICULAR AUTHENTICATION PROCESS BY USING AUTHENTICATION INFORMATION
S114
HAS INTRA-VEHICULAR AUTHENTICATION FAILED?
NO
YES
S118
START OR CONTINUE RELAY OF INFORMATION BETWEEN IN-VEHICLE ECUS
S120
HAS VALIDITY TIME LIMIT EXPIRED?
NO
YES
S122
CAN COMMUNICATE WITH SERVER?
NO
YES
S116
STOP RELAY OF INFORMATION BETWEEN IN-VEHICLE ECUS
S124
NOT TRAVELING?
NO
YES
S126
EXTENSION PROCESS

RELAY DEVICE AND VEHICLE COMMUNICATION METHOD

CROSS-REFERENCE TO RELATED APPLICATION(S)

This application is a continuation of U.S. Ser. No. 17/624,784 filed Jan. 4, 2022, which issued as U.S. Pat. No. 12,395,840 on Aug. 19, 2025 and is a national stage entry of PCT/JP2020/022988 filed Jun. 11, 2020, which claims priority to Japanese Patent Application No. 2019-126255 filed on Jul. 5, 2019, the entire disclosures of these applications being incorporated by reference herein.

TECHNICAL FIELD

The present disclosure relates to a relay device and a vehicle communication method.

BACKGROUND ART

PATENT LITERATURE 1 (Japanese Laid-Open Patent Publication No. 2013-193598) discloses a vehicle authentication device as below. That is, the vehicle authentication device is a vehicle authentication device (11) mounted to a vehicle and provided to an electronic control device (1) connected via an in-vehicle network to an in-vehicle communication device (2) that can perform communication by using an internet protocol with an external device (3) outside the vehicle, through at least a wireless manner out of a wireless manner or a wired manner. The vehicle authentication device (11) includes: identification information acquisition means (11, S1) that, when information including identification information for specifying the external device has been transmitted from the external device to the communication device, acquires this identification information; state determination means (11, S5) that determines whether or not the state of the vehicle corresponds to a security securing state, which is a state where an authentic user whose operation of the vehicle is permitted operates or has operated the vehicle; registration means (11, S7) that registers the identification information acquired by the identification information acquisition means into a storage device (12) mounted to the vehicle, when the state determination means has determined that the state of the vehicle corresponds to the security securing state, and that does not register the identification information into the storage device when the state determination means has determined that the state of the vehicle does not correspond to the security securing state; registration determination means (11, S2) that determines, when identification information has been acquired by the identification information acquisition means, whether or not the identification information has been registered in the storage device; and authentication means (11, S3, S6) that, when the registration determination means has determined that the identification information has been registered in the storage device, permits exchange of information between the electronic control device and the external device specified by the identification information, and that prohibits exchange of information between the electronic control device and the external device specified by the identification information, on the basis of a fact that the registration determination means has determined that the identification information has not been registered in the storage device.

CITATION LIST

Patent Literature

PATENT LITERATURE 1: Japanese Laid-Open Patent Publication No. 2013-193598

SUMMARY OF INVENTION

A relay device of the present disclosure is mounted to a vehicle including a plurality of function units. The relay device includes: an authentication processing unit configured to acquire authentication information of a function unit from an external device outside the vehicle, and perform an authentication process regarding the function unit by using the acquired authentication information; and a relay processing unit configured to, on the basis of a result of the authentication process performed by the authentication processing unit, relay information between the function unit and another function unit. When a validity time limit of the authentication information has expired, the authentication processing unit acquires, from the external device, the authentication information that is new.

A vehicle communication method of the present disclosure is to be performed in a relay device mounted in a vehicle including a plurality of function units. The vehicle communication method includes the steps of: acquiring authentication information of a function unit from an external device outside the vehicle; performing an authentication process regarding the function unit by using the acquired authentication information; relaying, on the basis of a result of the authentication process, information between the function unit and another function unit; and acquiring, when a validity time limit of the authentication information has expired, the authentication information that is new, from the external device.

One mode of the present disclosure can be realized as a semiconductor integrated circuit that realizes a part or the entirety of the relay device or can be realized as a system that includes the relay device. One mode of the present disclosure can be realized as a program for causing a computer to execute process steps performed in the relay device.

BRIEF DESCRIPTION OF DRAWINGS

FIG. 5 is a flow chart describing an operation procedure according to which the relay device in the communication system according to the embodiment of the present disclosure relays information between in-vehicle ECUs on the basis of a result of an authentication process.

DESCRIPTION OF EMBODIMENTS

Figure 1:
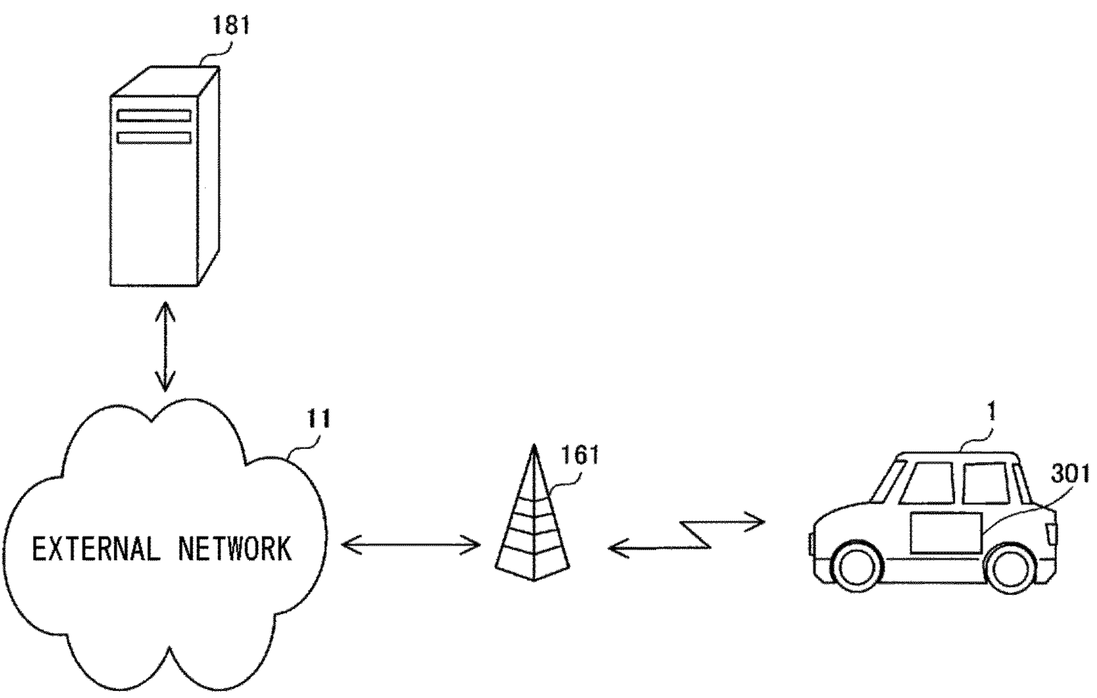
FIG. 1 shows a configuration of a communication system according to an embodiment of the present disclosure.

To date, in-vehicle network systems for improving security in in-vehicle networks have been developed.

Problems to be Solved by the Present Disclosure

A technology that exceeds the technology described in PATENT LITERATURE 1 and that can improve security in in-vehicle networks is desired.

The present disclosure has been made in order to solve the above problem. An object of the present disclosure is to provide a relay device and a vehicle communication method that are capable of improving security in an in-vehicle network.

Effects of the Present Disclosure

According to the present disclosure, security in the in-vehicle network can be improved.

Description of Embodiment of the Present Disclosure

First, the contents of an embodiment of the present disclosure are listed and described.

(1) A relay device according to an embodiment of the present disclosure is mounted to a vehicle including a plurality of function units. The relay device includes: an authentication processing unit configured to acquire authentication information of a function unit from an external device outside the vehicle, and perform an authentication process regarding the function unit by using the acquired authentication information; and a relay processing unit configured to, on the basis of a result of the authentication process performed by the authentication processing unit, relay information between the function unit and another function unit. When a validity time limit of the authentication information has expired, the authentication processing unit acquires, from the external device, the authentication information that is new.

Thus, with the configuration in which authentication information of a function unit is acquired from the external device outside the vehicle, even when a new unknown function unit has been added to the in-vehicle network, the authentication information of the function unit can be acquired. Further, when the validity time limit has expired, new authentication information is acquired, the authentication process regarding the function unit is performed by using the acquired authentication information, and on the basis of the result of the authentication process, information between function units is relayed. With this configuration, security in the in-vehicle network can be ensured. In addition, even in a situation where the communication environment between the relay device and the external device is bad due to the traveling environment of the vehicle and it is difficult to acquire new authentication information from the external device, the authentication process regarding the function unit can be performed by continuously using the authentication information. Therefore, security in the in-vehicle network can be improved.

(2) Preferably, when the validity time limit of the authentication information has expired and the relay device is not able to communicate with the external device, the authentication processing unit performs an extension process of maintaining validity of the authentication information, and performs, by using extended authentication information being the authentication information of which the validity has been maintained, an authentication process regarding the function unit corresponding to the authentication information.

With this configuration, even in a case where, when the validity time limit of the authentication information has expired, the communication environment between the relay device and the external device is bad due to the traveling environment of the vehicle and new authentication information cannot be acquired, it is possible to perform an authentication process and continue relay of information between function units based on the authentication result. Accordingly, for example, in a configuration in which security is improved by updating the content of the authentication information at the outside of the vehicle, it is possible to manage stable communication in the in-vehicle network, irrespective of the traveling environment of the vehicle.

(3) Preferably, the relay processing unit determines, in accordance with a type of the function unit, a content of information that should be relayed when the authentication process using the extended authentication information by the authentication processing unit has been successful.

With this configuration, a part of information to be relayed when the extension process has been performed can be restricted in accordance with the type of the function unit. Therefore, for example, by continuing relay of information between function units that will influence traveling of the vehicle, and at the same time, by stopping relay of information between function units that will not influence traveling of the vehicle, it is possible to suppress decrease in security in the in-vehicle network while maintaining favorable traveling of the vehicle.

(4) Preferably, the relay processing unit determines, in accordance with a type of information received from the function unit, whether or not to perform relay when the authentication process using the extended authentication information by the authentication processing unit has been successful.

With this configuration, a part of information to be relayed when the extension process has been performed can be restricted in accordance with the type of information received from the function unit. Therefore, for example, by continuing relay of information that will influence traveling of the vehicle, and at the same time, by stopping relay of information that will not influence traveling of the vehicle, it is possible to suppress decrease in security in the in-vehicle network while maintaining favorable traveling of the vehicle.

(5) Preferably, the authentication processing unit acquires, from the external device, the authentication information that has a content that is different every time the authentication information is acquired.

With this configuration, every time the validity time limit has expired, authentication information that has a new content can be acquired, and an authentication process regarding the function unit can be performed by using the authentication information. Therefore, security in the in-vehicle network can be further improved.

(6) Preferably, when the vehicle is traveling in a state where communication between the relay device and the external device is possible and where the validity time limit of the authentication information has expired, the authentication processing unit performs an extension process of maintaining validity of the authentication information without acquiring, from the external device, the authentication information that is new.

With this configuration, for example, a situation where an authentication error occurs as a result of performing an authentication process by using new authentication information, and relay of a part or all of information between function units is stopped during traveling of the vehicle, can be avoided. Thus, favorable traveling of the vehicle can be maintained.

(7) A vehicle communication method according to an embodiment of the present disclosure is to be performed in a relay device mounted in a vehicle including a plurality of function units. The vehicle communication method includes the steps of: acquiring authentication information of a function unit from an external device outside the vehicle; performing an authentication process regarding the function unit by using the acquired authentication information; relaying, on the basis of a result of the authentication process, information between the function unit and another function unit; and acquiring, when a validity time limit of the authentication information has expired, the authentication information that is new, from the external device.

Thus, with the method in which authentication information of a function unit is acquired from the external device outside the vehicle, even when a new unknown function unit has been added to the in-vehicle network, the authentication information of the function unit can be acquired. Further, when the validity time limit has expired, new authentication information is acquired, the authentication process regarding the function unit is performed by using the acquired authentication information, and on the basis of the result of the authentication process, information between function units is relayed. With this method, security in the in-vehicle network can be ensured. In addition, even in a situation where the communication environment between the relay device and the external device is bad due to the traveling environment of the vehicle and it is difficult to acquire new authentication information from the external device, the authentication process regarding the function unit can be performed by continuously using the authentication information. Therefore, security in the in-vehicle network can be improved.

Hereinafter, an embodiment of the present disclosure will be described with reference to the drawings. In the drawings, the same or corresponding parts are denoted by the same reference signs, and description thereof is not repeated. At least some parts of the embodiment described below may be combined as desired.

[Communication System]

FIG. 1 shows a configuration of a communication system according to an embodiment of the present disclosure.

With reference to FIG. 1, a communication system 401 includes a server 181 and an in-vehicle communication system 301. The in-vehicle communication system 301 is mounted to a vehicle 1.

Figure 2:
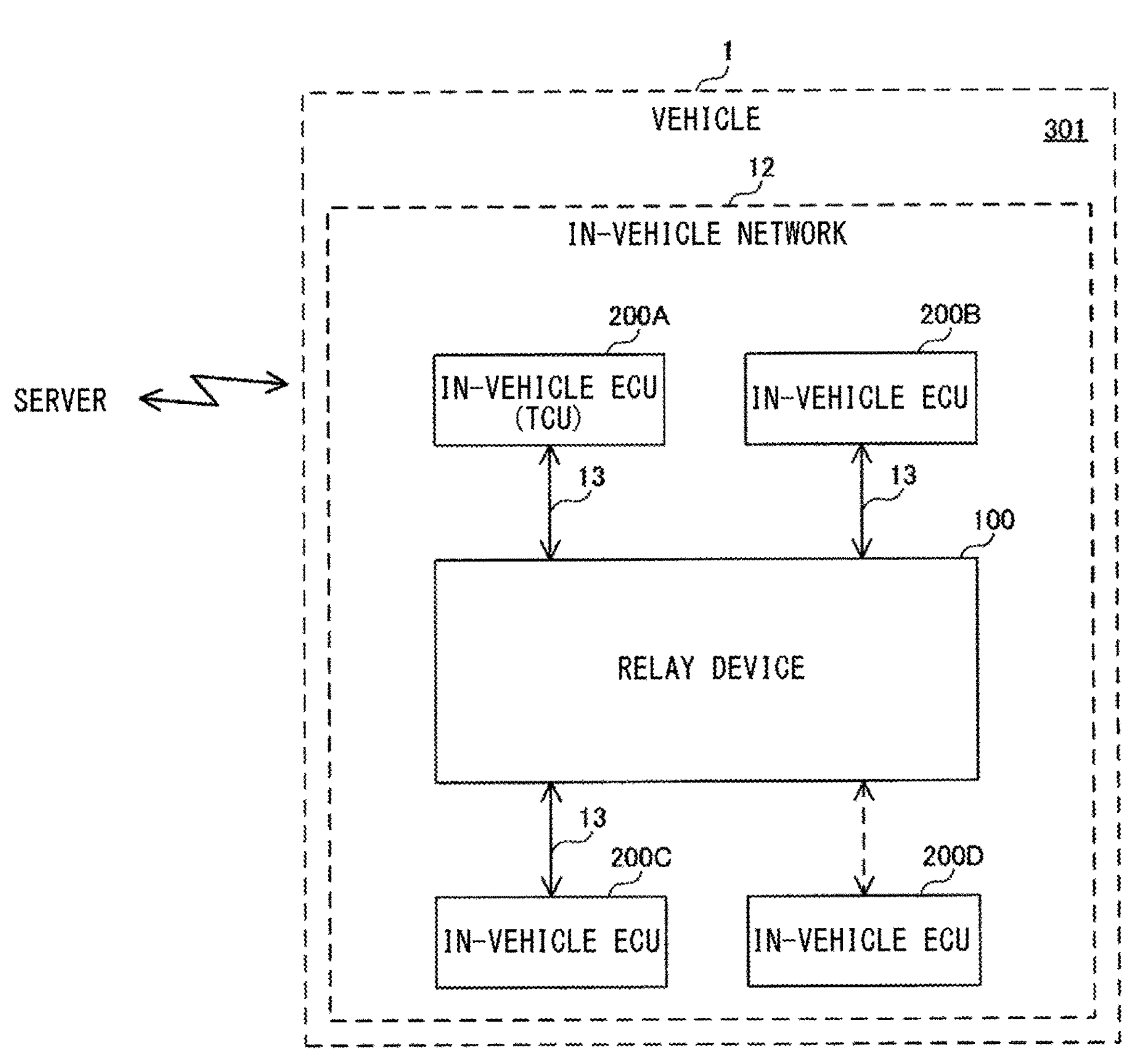
FIG. 2 shows a configuration of an in-vehicle communication system according to the embodiment of the present disclosure.

FIG. 2 shows a configuration of the in-vehicle communication system according to the embodiment of the present disclosure.

With reference to FIG. 2, the in-vehicle communication system 301 includes in-vehicle ECUs (Electronic Control Units) 200A to 200D and a relay device 100.

Hereinafter, each of the in-vehicle ECUs 200A to 200D will also referred to as an in-vehicle ECU 200. The in-vehicle ECU 200 and the relay device 100 are an example of an in-vehicle device.

The in-vehicle communication system 301 need not necessarily be provided with four in-vehicle ECUs 200 and may be provided with three or less or five or more in-vehicle ECUs 200. The in-vehicle communication system 301 need not necessarily be provided with one relay device 100 and may be provided with two or more relay devices 100.

Each in-vehicle ECU 200 and the relay device 100 form an in-vehicle network 12. The in-vehicle ECU 200 is an example of a function unit in the in-vehicle network 12. In the in-vehicle network 12, the in-vehicle ECU 200 is connected to the relay device 100 via an Ethernet (registered trademark) cable 13.

The relay device 100 is a switch device, for example, and can relay information between a plurality of in-vehicle ECUs 200 connected to the relay device 100. More specifically, the relay device 100 can perform a relay process according to a layer 2, and a layer 3, which is of a higher order than the layer 2, for example.

The in-vehicle ECU 200A is a TCU (Telematics Communication unit), for example. Hereinafter, the in-vehicle ECU 200A will also be referred to as a TCU 200A.

The in-vehicle ECUs 200B to 200D are an automated driving ECU (Electronic Control Unit), a sensor, a navigation device, an accelerator control ECU, a brake control ECU, a steering control ECU, a human machine interface, and the like, for example.

For example, the in-vehicle ECU 200D is not connected to the relay device 100 in the initial state. For example, at any of a manufacturing factory for the vehicle 1, a dealer for the vehicle 1, a retailer for replacement parts for the vehicle 1, etc., the in-vehicle ECU 200D is mounted to the vehicle 1 and connected to the relay device 100 via an Ethernet cable. The relay device 100 performs a relay process of an Ethernet frame in accordance with an Ethernet communication standard. Specifically, the relay device 100 relays an Ethernet frame that is sent and received between in-vehicle ECUs 200, for example. An IP packet is stored in the Ethernet frame.

The configuration of the in-vehicle communication system 301 is not limited to a configuration in which relay of the Ethernet frame is performed in accordance with the Ethernet communication standard, and may be a configuration in which relay of data is performed in accordance with another communication standard such as CAN (Controller Area Network) (registered trademark), FlexRay (registered trademark), MOST (Media Oriented Systems Transport) (registered trademark), or LIN (Local Interconnect Network), for example.

With reference to FIG. 1 and FIG. 2, the TCU 200A can communicate with the server 181 outside the vehicle 1. Specifically, the TCU 200A can communicate with the server 181 via a wireless base station device 161 by using an IP packet, for example.

More specifically, for example, the TCU 200A can perform wireless communication with the wireless base station device 161 outside the vehicle 1 in accordance with a communication standard such as LTE (Long Term Evolution) or 3G.

Specifically, when the wireless base station device 161 has received an IP packet via an external network 11 from the server 181 outside the vehicle 1, the wireless base station device 161 causes the received IP packet to be included in a radio signal, and transmits the radio signal to the TCU 200A.

For example, when the TCU 200A has received, from the wireless base station device 161, a radio signal including an IP packet from the server 181, the TCU 200A acquires the IP packet from the received radio signal, stores the acquired IP packet into an Ethernet frame, and transmits the Ethernet frame to the relay device 100.

Meanwhile, when the TCU 200A has received an Ethernet frame from the relay device 100, the TCU 200A acquires an IP packet from the received Ethernet frame, causes the acquired IP packet to be included in a radio signal, and transmits the radio signal to the wireless base station device 161.

Upon receiving the radio signal from the TCU 200A, the wireless base station device 161 acquires the IP packet from the received radio signal, and transmits the acquired IP packet to the server 181 via the external network 11.

[On-Vehicle ECU]

Figure 3:
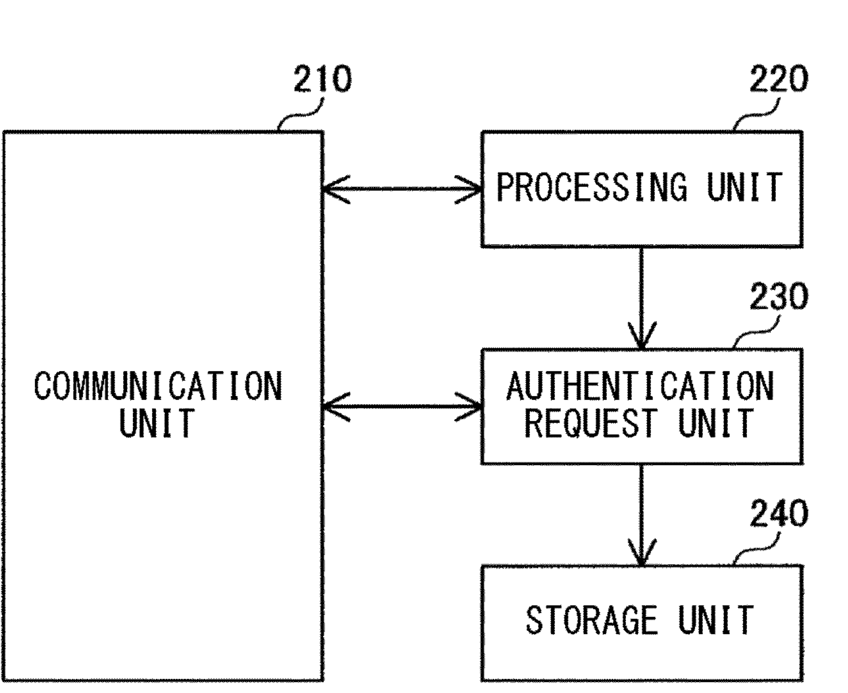
FIG. 3 shows a configuration of an in-vehicle ECU according to the embodiment of the present disclosure.

FIG. 3 shows a configuration of an in-vehicle ECU according to the embodiment of the present disclosure.

With reference to FIG. 3, the in-vehicle ECU 200 includes a communication unit 210, a processing unit 220, an authentication request unit 230, and a storage unit 240. The storage unit 240 is a flash memory, for example.

When the communication unit 210 has received an Ethernet frame from the relay device 100 via a corresponding Ethernet cable 13, the communication unit 210 outputs the received Ethernet frame to the processing unit 220.

The processing unit 220 acquires information included in the Ethernet frame received from the communication unit 210, and performs a predetermined process by using the acquired information.

In addition, the processing unit 220 generates an Ethernet frame addressed to another in-vehicle ECU 200, and outputs the generated Ethernet frame to the communication unit 210.

Upon receiving the Ethernet frame from the processing unit 220, the communication unit 210 transmits the received Ethernet frame to the relay device 100 via a corresponding Ethernet cable 13.

Meanwhile, when the processing unit 220 acquires a common key described later from an Ethernet frame received from the communication unit 210, the processing unit 220 outputs the acquired common key to the authentication request unit 230.

Upon receiving the common key from the processing unit 220, the authentication request unit 230 stores the received common key into the storage unit 240.

When the in-vehicle ECU 200 to which the authentication request unit 230 belongs has been connected to the relay device 100 via an Ethernet cable 13, the authentication request unit 230 generates an Ethernet frame having stored therein authentication request information that includes the ID of the in-vehicle ECU 200, e.g., a MAC address, and transmits the generated Ethernet frame to the relay device 100 via the communication unit 210.

[Relay Device]

Figure 4:
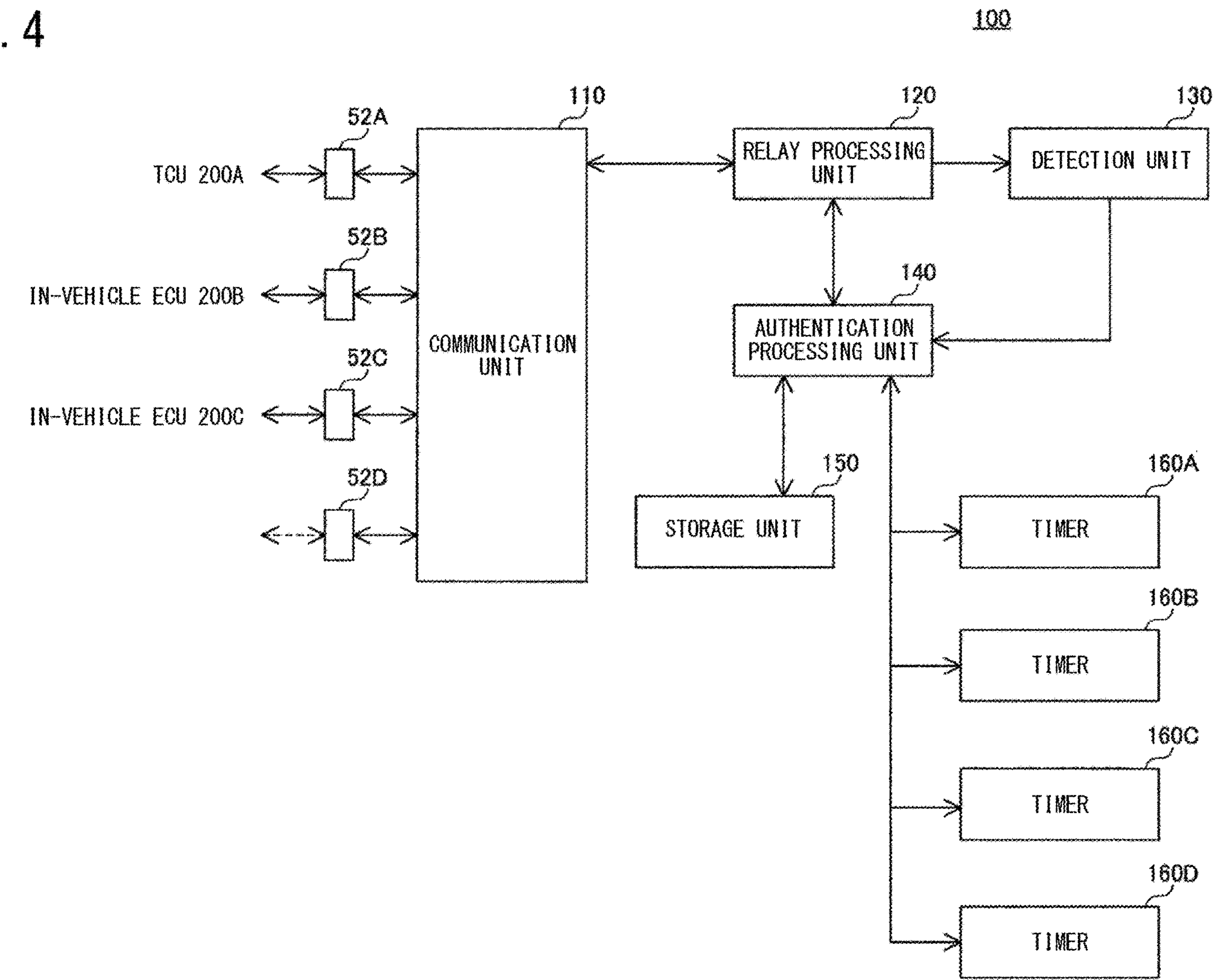
FIG. 4 shows a configuration of a relay device according to the embodiment of the present disclosure.

FIG. 4 shows a configuration of the relay device according to the embodiment of the present disclosure.

With reference to FIG. 4, the relay device 100 includes communication ports 52A, 52B, 52C, 52D, a communication unit 110, a relay processing unit 120, a detection unit 130, an authentication processing unit 140, a storage unit 150, and timers 160. The storage unit 150 is a flash memory, for example.

For example, the relay device 100 includes timers 160 the number of which corresponds to the communication ports 52A, 52B, 52C, 52D. Specifically, the relay device 100 includes timers 160A, 160B, 160C, 160D as the timers 160.

Hereinafter, each of the communication ports 52A, 52B, 52C, 52D will also be referred to as a communication port 52. The communication port 52 is a terminal to which an Ethernet cable can be connected, for example.

In this example, the communication ports 52A, 52B, 52C are connected to the TCU 200A, the in-vehicle ECU 200B, and the in-vehicle ECU 200C, respectively.

When the communication unit 110 has received an Ethernet frame via a corresponding communication port 52 from a certain in-vehicle ECU 200, the communication unit 110 outputs the received Ethernet frame to the relay processing unit 120.

When the communication unit 110 has received, from the relay processing unit 120, an Ethernet frame addressed to a certain in-vehicle ECU 200, the communication unit 110 transmits the received Ethernet frame to the in-vehicle ECU 200 via a corresponding communication port 52.

The relay processing unit 120 performs a relay process of an Ethernet frame between in-vehicle ECUs 200. Specifically, for example, upon receiving an Ethernet frame from the communication unit 110, the relay processing unit 120 performs a relay process for the layer 2 or a relay process for the layer 3, onto the received Ethernet frame.

Meanwhile, when the relay processing unit 120 has received an Ethernet frame having stored therein authentication request information from an in-vehicle ECU 200 that is newly added to the in-vehicle network 12, the relay processing unit 120 acquires the authentication request information from the received Ethernet frame, and outputs the acquired authentication request information to the detection unit 130.

[Detection Unit]

The detection unit 130 detects a new function unit that has been newly added to the in-vehicle network 12. For example, the detection unit 130 detects, as the new function unit, the in-vehicle ECU 200D that has newly been added to the in-vehicle network 12.

With reference to FIG. 2 and FIG. 4, the in-vehicle ECU 200D is connected to the communication port 52D in the relay device 100 via an Ethernet cable 13.

The detection unit 130 in the relay device 100 receives authentication request information from the in-vehicle ECU 200D via the relay processing unit 120, thereby detecting addition of the in-vehicle ECU 200D to the in-vehicle network 12.

The detection unit 130 outputs the authentication request information received from the relay processing unit 120, to the authentication processing unit 140.

[Authentication Processing Unit]

The authentication processing unit 140 acquires authentication information of an in-vehicle ECU 200 from an external device outside the vehicle 1.

More specifically, when the authentication processing unit 140 has received authentication request information from the detection unit 130, the authentication processing unit 140 acquires authentication information of the in-vehicle ECU 200D serving as a new function unit indicated by the authentication request information, from the server 181 in accordance with a procedure conforming to IEEE802.1X, for example.

The server 181 performs an authentication process regarding an in-vehicle ECU 200 by using an authentication protocol in accordance with the procedure conforming to IEEE802.1X, for example, thereby generating authentication information of the in-vehicle ECU 200. Hereinafter, the authentication process regarding an in-vehicle ECU 200 performed by the server 181 will also be referred to as an extra-vehicular authentication process.

Here, for example, as an authentication scheme to be used in the extra-vehicular authentication process by the server 181, EAP (Extended Authentication Protocol)-MD (Message Digest algorithm) 5, EAP-TLS (Transport Layer Security), PEAP (Protected EAP), LEAP (Lightweight EAP), EAP-TTLS (EAP-Tunneled Transport Layer Security), or the like can be used in accordance with the type of the authentication protocol to be used in the authentication process.

For example, the storage unit 150 has stored therein an authentication scheme to be used in the extra-vehicular authentication process by the server 181.

When the authentication processing unit 140 has received authentication request information from the detection unit 130, the authentication processing unit 140 acquires, from the storage unit 150, the authentication scheme to be used in the extra-vehicular authentication process by the server 181, and transmits authentication scheme information indicating the acquired authentication scheme, to the in-vehicle ECU 200D serving as the new function unit indicated by the authentication request information, via the relay processing unit 120 and the communication unit 110.

The in-vehicle ECU 200D and the server 181 send and receive, via the relay device 100, an EAP message that includes information necessary for the extra-vehicular authentication process.

The authentication processing unit 140 in the relay device 100 relays the EAP message and the like sent and received between the server 181 and the in-vehicle ECU 200D.

More specifically, when the authentication processing unit 140 has received an Ethernet frame having stored therein an EAP message from the in-vehicle ECU 200D via the communication unit 110 and the relay processing unit 120, the authentication processing unit 140 converts the received Ethernet frame into a RADIUS (Remote Authentication Dial In User Service) frame and transmits the converted RADIUS frame to the server 181 via the communication unit 110 and the TCU 200A.

When the authentication processing unit 140 has received a RADIUS frame from the server 181 via the TCU 200A, the communication unit 110, and the relay processing unit 120, the authentication processing unit 140 converts the received RADIUS frame into an Ethernet frame, and transmits the converted Ethernet frame to the in-vehicle ECU 200D via the communication unit 110.

The server 181 performs the extra-vehicular authentication process regarding the in-vehicle ECU 200D by using the EAP message received from the in-vehicle ECU 200 via the relay device 100. Then, when the server 181 has succeeded in authentication of the in-vehicle ECU 200D through the extra-vehicular authentication process, the server 181 generates authentication information that indicates an authentication success, and transmits the generated authentication information to the relay device 100 via the wireless base station device 161 and the TCU 200A.

Meanwhile, when the server 181 has failed in authentication of the in-vehicle ECU 200D, the server 181 generates authentication information that indicates an authentication failure, and transmits the generated authentication information to the relay device 100 via the wireless base station device 161 and the TCU 200A.

When the authentication processing unit 140 has received the authentication information indicating the authentication success from the server 181 via the TCU 200A, the communication unit 110, and the relay processing unit 120, the authentication processing unit 140 generates extra-vehicular authentication success information indicating that the extra-vehicular authentication process has been successful, and outputs the generated extra-vehicular authentication success information to the relay processing unit 120.

Upon receiving the extra-vehicular authentication success information from the authentication processing unit 140, the relay processing unit 120 transmits the received extra-vehicular authentication success information to the in-vehicle ECU 200D via the communication unit 110.

Here, when the authentication processing unit 140 has received authentication information that indicates an authentication success from the server 181 via the communication unit 110 and the relay processing unit 120, the authentication processing unit 140 sets a valid time of the authentication information to a timer 160, for each in-vehicle ECU 200.

For example, the authentication processing unit 140 sets, to the timer 160A, a valid time of the authentication information of the TCU 200A connected to the communication port 52A; sets, to the timer 160B, a valid time of the authentication information of the in-vehicle ECU 200B connected to the communication port 52A; sets, to the timer 160C, a valid time of the authentication information of the in-vehicle ECU 200C connected to the communication port 52C; and sets, to the timer 160D, a valid time of the authentication information of the in-vehicle ECU 200D connected to the communication port 52D.

Meanwhile, when the authentication processing unit 140 has received authentication information that indicates an authentication failure from the server 181 via the TCU 200A, the communication unit 110, and the relay processing unit 120, the authentication processing unit 140 outputs connection non-permitting information to the relay processing unit 120.

Upon receiving the connection non-permitting information from the authentication processing unit 140, the relay processing unit 120 transmits the received connection non-permitting information to the in-vehicle ECU 200D via the communication unit 110.

The authentication processing unit 140 performs an authentication process regarding the in-vehicle ECU 200 by using the authentication information that indicates an authentication success and that has been acquired from the server 181. Hereinafter, the authentication process regarding the in-vehicle ECU 200 performed by the authentication processing unit 140 will also be referred to as intra-vehicular authentication process.

The relay processing unit 120 relays information between in-vehicle ECUs 200 on the basis of the result of the intra-vehicular authentication process performed by the authentication processing unit 140.

Authentication Example 1

For example, authentication information that is received from the server 181 by the authentication processing unit 140 and that indicates an authentication success includes a common key.

When the authentication processing unit 140 has received authentication information of an in-vehicle ECU 200 from the server 181 via the TCU 200A, the communication unit 110, and the relay processing unit 120, the authentication processing unit 140 sets, to a corresponding timer 160, a predetermined valid time of the received authentication information.

Then, the authentication processing unit 140 acquires a common key from the received authentication information, and stores the acquired common key into the storage unit 150 in association with the in-vehicle ECU 200. For example, the authentication processing unit 140 stores the acquired common key into the storage unit 150 in association with a communication port 52.

The authentication processing unit 140 generates extra-vehicular authentication success information that includes the common key, and transmits the generated extra-vehicular authentication success information to the corresponding in-vehicle ECU 200 via the communication unit 110.

With reference to FIG. 3 again, when the authentication request unit 230 in the in-vehicle ECU 200 has received the extra-vehicular authentication success information from the authentication processing unit 140 in the relay device 100 via the communication unit 210, the authentication request unit 230 acquires the common key from the received extra-vehicular authentication success information, and stores the acquired common key into the storage unit 240.

For example, periodically or non-periodically, the authentication processing unit 140 in the relay device 100 performs an intra-vehicular authentication process for each in-vehicle ECU 200 by using a corresponding common key in the storage unit 150.

Specifically, the authentication processing unit 140 generates a random number, for example, and transmits the generated random number to a corresponding in-vehicle ECU 200 via the communication unit 110. In addition, the authentication processing unit 140 encrypts the generated random number by using the common key, to generate encrypted data.

When the authentication request unit 230 in the in-vehicle ECU 200 has received the random number, the authentication request unit 230 encrypts the received random number by using the common key in the storage unit 240, to generate encrypted data. The in-vehicle ECU 200 transmits the generated encrypted data to the relay device 100.

When the authentication processing unit 140 in the relay device 100 has received the encrypted data from the in-vehicle ECU 200 via the communication unit 110, the authentication processing unit 140 collates the received encrypted data with the encrypted data generated by the authentication processing unit 140.

When the encrypted data received from the in-vehicle ECU 200 matches the encrypted data generated by the authentication processing unit 140, the authentication processing unit 140 determines that the intra-vehicular authentication process regarding the in-vehicle ECU 200 has been successful. Then, the authentication processing unit 140 outputs, to the relay processing unit 120, intra-vehicular authentication success information indicating that the authentication of the in-vehicle ECU 200 has been successful.

Upon receiving the intra-vehicular authentication success information from the authentication processing unit 140, the relay processing unit 120 starts or continues relay of information between the in-vehicle ECU 200 and another in-vehicle ECU 200.

More specifically, when the relay processing unit 120 has received intra-vehicular authentication success information from the authentication processing unit 140, the relay processing unit 120 starts or continues relay of an Ethernet frame between the in-vehicle ECU 200 and another in-vehicle ECU 200.

Meanwhile, when the encrypted data received from the in-vehicle ECU 200 does not match the encrypted data generated by the authentication processing unit 140, the authentication processing unit 140 determines that the intra-vehicular authentication process regarding the in-vehicle ECU 200 has failed. Then, the authentication processing unit 140 outputs, to the relay processing unit 120, intra-vehicular authentication failure information indicating that the authentication of the in-vehicle ECU 200 has failed.

Upon receiving the intra-vehicular authentication failure information from the authentication processing unit 140, the relay processing unit 120 stops relay of information between the in-vehicle ECU 200 and another in-vehicle ECU 200.

More specifically, when the relay processing unit 120 has received the intra-vehicular authentication failure information from the authentication processing unit 140, the relay processing unit 120 starts discarding an Ethernet frame received from the in-vehicle ECU 200, and an Ethernet frame addressed to the in-vehicle ECU 200 and received from another in-vehicle ECU 200.

When the intra-vehicular authentication process regarding the in-vehicle ECU 200 has failed, the authentication processing unit 140 acquires new authentication information of the in-vehicle ECU 200 from the server 181 in accordance with the procedure conforming to IEEE802.1X, for example.

When the authentication processing unit 140 has received, from the server 181, authentication information that indicates an authentication success, as new authentication information, the authentication processing unit 140 stores the common key included in the received authentication information into the storage unit 150 and sets, to a timer 160, a predetermined valid time of the new authentication information. In addition, the authentication processing unit 140 transmits the common key to the in-vehicle ECU 200 via the relay processing unit 120 and the communication unit 110.

Then, the authentication processing unit 140 performs the intra-vehicular authentication process regarding the in-vehicle ECU 200 again, by using the common key. Specifically, the authentication processing unit 140 generates a random number and encrypted data, transmits the generated encrypted data to the in-vehicle ECU 200, and collates the encrypted data received from the in-vehicle ECU 200 with the encrypted data generated by the authentication processing unit 140.

Meanwhile, when the authentication processing unit 140 has received, from the server 181, authentication information that indicates an authentication failure, as new authentication information, the authentication processing unit 140 outputs connection non-permitting information to the relay processing unit 120.

Authentication Example 2

For example, the authentication information received from the server 181 by the authentication processing unit 140 includes a MAC address of an in-vehicle ECU 200 that has been authenticated by the server 181. Hereinafter, the MAC address of an authenticated in-vehicle ECU 200 will also be referred to as an authenticated MAC address.

When the authentication processing unit 140 has received authentication information of an in-vehicle ECU 200 from the server 181 via the TCU 200A, the communication unit 110, and the relay processing unit 120, the authentication processing unit 140 sets a predetermined valid time of the received authentication information to a corresponding timer 160.

Then, the authentication processing unit 140 acquires the authenticated MAC address from the received authentication information, and stores the acquired authenticated MAC address into the storage unit 150 in association with the in-vehicle ECU 200. For example, the authentication processing unit 140 stores the acquired authenticated MAC address into the storage unit 150 in association with a communication port 52.

The authentication processing unit 140 transmits extra-vehicular authentication success information to the corresponding in-vehicle ECU 200 via the communication unit 110. For example, periodically or non-periodically, the authentication processing unit 140 performs an authentication process for each in-vehicle ECU 200 by using a corresponding authenticated MAC address in the storage unit 150.

For example, the authentication processing unit 140 acquires the transmission source MAC address included in an Ethernet frame received via a communication port 52 from a corresponding in-vehicle ECU 200 by the communication unit 110, and collates the acquired transmission source MAC address with the authenticated MAC address associated with the communication port 52.

When the acquired transmission source MAC address matches the authenticated MAC address, the authentication processing unit 140 outputs, to the relay processing unit 120, intra-vehicular authentication success information indicating that authentication of the in-vehicle ECU 200 has been successful.

Upon receiving the intra-vehicular authentication success information from the authentication processing unit 140, the relay processing unit 120 starts or continues relay of information between the in-vehicle ECU 200 and another in-vehicle ECU 200.

Meanwhile, when the acquired transmission source MAC address does not match the authenticated MAC address, the authentication processing unit 140 outputs, to the relay processing unit 120, intra-vehicular authentication failure information indicating that authentication of the in-vehicle ECU 200 has failed.

Upon receiving the intra-vehicular authentication failure information from the authentication processing unit 140, the relay processing unit 120 starts discarding an Ethernet frame received from the in-vehicle ECU 200 and an Ethernet frame addressed to the in-vehicle ECU 200 received from another in-vehicle ECU 200.

When the intra-vehicular authentication process regarding the in-vehicle ECU 200 has failed, the authentication processing unit 140 acquires new authentication information of the in-vehicle ECU 200 connected to the communication port 52, from the server 181, in accordance with the procedure conforming to IEEE802.1X, for example.

When the authentication processing unit 140 has received, from the server 181, authentication information that indicates an authentication success, as new authentication information, the authentication processing unit 140 stores the authenticated MAC address included in the received authentication information into the storage unit 150, and sets, to a timer 160, a predetermined valid time of the new authentication information.

Then, the authentication processing unit 140 performs the authentication process regarding the in-vehicle ECU 200 again, by using the authenticated MAC address. Specifically, the authentication processing unit 140 acquires the transmission source MAC address included in an Ethernet frame received via the communication port 52 by the communication unit 110, and collates the acquired transmission source MAC address with the authenticated MAC address associated with the communication port 52.

Meanwhile, when the authentication processing unit 140 has received, from the server 181, authentication information that indicates an authentication failure, as new authentication information, the authentication processing unit 140 outputs connection non-permitting information to the relay processing unit 120.

[Update of Authentication Information]

When the validity time limit of authentication information of a certain in-vehicle ECU 200 has expired, the authentication processing unit 140 acquires new authentication information of the in-vehicle ECU 200 from the server 181.

More specifically, when the timer 160 of the corresponding in-vehicle ECU 200 has expired, the authentication processing unit 140 discards the common key or the authenticated MAC address in the storage unit 150.

Then, the authentication processing unit 140 acquires new authentication information of the in-vehicle ECU 200 from the server 181 in accordance with the procedure conforming to IEEE802.1X, for example.

For example, every time the server 181 performs an extra-vehicular authentication process and succeeds in authentication, the server 181 generates authentication information that has a different content. More specifically, every time the server 181 performs an extra-vehicular authentication process and succeeds in authentication, the server 181 generates authentication information that includes a different common key.

That is, the authentication processing unit 140 acquires, from the server 181, authentication information that has a content that is different every time the authentication information is acquired. More specifically, the authentication processing unit 140 acquires, from the server 181, authentication information of which the common key is updated every time the authentication information is acquired.

When the authentication processing unit 140 has received new authentication information from the server 181, the authentication processing unit 140 stores the common key included in the received authentication information into the storage unit 150, and sets, to a timer 160, a predetermined valid time of the authentication information. In addition, the authentication processing unit 140 transmits the common key to the in-vehicle ECU 200 via the relay processing unit 120 and the communication unit 110.

[Extension Process]

When the validity time limit of authentication information has expired and the relay device 100 cannot communicate with the server 181, the authentication processing unit 140 performs an extension process of maintaining the validity of the authentication information.

For example, when the timer 160 has expired, the authentication processing unit 140 transmits, to the server 181, a communication confirmation request via the communication unit 110 and the TCU 200A in order to confirm whether or not the state is a state where communication with the server 181 is possible.

Upon receiving the communication confirmation request, the server 181 transmits communication-possible information as a response to the communication confirmation request, to the relay device 100 via the wireless base station device 161 and the TCU 200A.

When the authentication processing unit 140 has received the communication-possible information from the server 181 via the communication unit 110 and the relay processing unit 120, the authentication processing unit 140 deletes the common key or the authenticated MAC address of the corresponding in-vehicle ECU 200 in the storage unit 150. Then, the authentication processing unit 140 acquires new authentication information of the in-vehicle ECU 200 from the server 181 in accordance with the procedure conforming to IEEE802.1X, for example.

Meanwhile, when the authentication processing unit 140 has not received communication-possible information within a predetermined period from the transmission of the communication confirmation request, the authentication processing unit 140 determines that the state is a state where the relay device 100 and the server 181 cannot communicate with each other, and performs an extension process of maintaining the validity of the authentication information.

More specifically, the authentication processing unit 140 sets, to a timer 160, a predetermined extension time of the authentication information without discarding the common key or the authenticated MAC address of the corresponding in-vehicle ECU 200 in the storage unit 150.

Alternatively, for example, when the vehicle 1 is traveling in a state where communication between the relay device 100 and the server 181 is possible and where the validity time limit of the authentication information has expired, the authentication processing unit 140 performs the extension process without acquiring new authentication information from the server 181.

For example, the authentication processing unit 140 acquires information indicating whether or not the vehicle 1 is traveling, from an in-vehicle ECU 200 such as an automated driving ECU, via the communication unit 110 and the relay processing unit 120. Even when the authentication processing unit 140 has received communication-possible information from the server 181 via the communication unit 110 and the relay processing unit 120, if the vehicle 1 is traveling, the authentication processing unit 140 sets, to a timer 160, a predetermined extension time of the authentication information without discarding the common key or the authenticated MAC address of the corresponding in-vehicle ECU 200 in the storage unit 150.

After the extension process, the authentication processing unit 140 performs an intra-vehicular authentication process regarding the corresponding in-vehicle ECU 200 by using extended authentication information being the authentication information of which the validity has been maintained. Specifically, the authentication processing unit 140 performs an authentication process regarding the in-vehicle ECU 200 by using the common key or the authenticated MAC address, in the storage unit 150, that corresponds to the extended authentication information.

When the authentication processing unit 140 has succeeded in authentication of the in-vehicle ECU 200 as a result of performing the authentication process regarding the in-vehicle ECU 200 by use of the extended authentication information, the authentication processing unit 140 outputs extended authentication success information to the relay processing unit 120.

Upon receiving the extended authentication success information from the authentication processing unit 140, the relay processing unit 120 continues relay of information between the in-vehicle ECU 200 and another in-vehicle ECU 200.

After performing the extension process, the authentication processing unit 140 transmits, periodically or non-periodically, a communication confirmation request to the server 181 and tries acquisition of new authentication information.

Until acquiring new authentication information, the authentication processing unit 140 performs the authentication process regarding the in-vehicle ECU 200 by using the extended authentication information.

[Relay Process Based on Extended Authentication Information]

The relay processing unit 120 determines, in accordance with the type of the in-vehicle ECU 200, the content of information that should be relayed when the authentication process using the extended authentication information by the authentication processing unit 140 has been successful.

Alternatively, the relay processing unit 120 determines, in accordance with the type of information received from the in-vehicle ECU 200, whether or not to perform relay when the authentication process using the extended authentication information by the authentication processing unit 140 has been successful.

The relay processing unit 120 determines the content of information, among information received from an in-vehicle ECU 200 and information addressed to the in-vehicle ECU 200, that should be relayed when extended authentication success information has been received from the authentication processing unit 140.

For example, the authentication information received from the server 181 by the authentication processing unit 140 includes the MAC address, the IP address, and the port number of an in-vehicle ECU 200 serving as a communication target of the corresponding in-vehicle ECU 200, and the port number and the like of the corresponding in-vehicle ECU 200.

When the authentication processing unit 140 has acquired these pieces of information from the authentication information, the authentication processing unit 140 outputs the acquired information to the relay processing unit 120.

On the basis of the information received from the authentication processing unit 140, the relay processing unit 120 determines the content of information that should be relayed when extended authentication success information has been received from the authentication processing unit 140.

For example, the relay processing unit 120 relays all of information between the in-vehicle ECU 200 and another in-vehicle ECU that will influence the driving state of the vehicle 1, such as an automated driving ECU. Meanwhile, the relay processing unit 120 stops relay of information between the in-vehicle ECU 200 and another in-vehicle ECU that will not influence the driving state of the vehicle 1.

For example, on the basis of the port number included in the information from the corresponding in-vehicle ECU 200 and the port number included in the information from the in-vehicle ECU 200 serving as the communication target of the corresponding in-vehicle ECU 200, the relay processing unit 120 discerns information that will influence the driving state of the vehicle 1, and relays all of the information that will influence the driving state of the vehicle 1 out of information between the in-vehicle ECU 200 and another in-vehicle ECU.

The relay processing unit 120 may be configured to determine, in accordance with both of the type of an in-vehicle ECU 200 and the type of information received from the in-vehicle ECU 200, whether or not to relay a part or all of information when the authentication process using the extended authentication information by the authentication processing unit 140 has been successful.

[Operation Flow]

Each device in the communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

FIG. 5 is a flow chart describing an operation procedure according to which the relay device in the communication system according to the embodiment of the present disclosure relays information between in-vehicle ECUs on the basis of a result of an authentication process.

With reference to FIG. 5, first, the relay device 100 waits for addition of a new function unit to the in-vehicle network 12 (NO in step S102). Upon detecting addition of the in-vehicle ECU 200D to the in-vehicle network 12 (YES in step S102), the relay device 100 acquires authentication information of the detected in-vehicle ECU 200D from the server 181 (step S104).

Next, when the relay device 100 has acquired, from the server 181, the authentication information that indicates an authentication failure (NO in step S106), the relay device 100 transmits connection non-permitting information to the in-vehicle ECU 200D (step S108).

Next, the relay device 100 waits for new addition of a new function unit to the in-vehicle network 12 (NO in step S102).

Meanwhile, when the relay device 100 has acquired, from the server 181, authentication information that indicates an authentication success (YES in step S106), the relay device 100 transmits extra-vehicular authentication success information to the corresponding in-vehicle ECU 200D (step S110).

Next, the relay device 100 performs an intra-vehicular authentication process regarding the in-vehicle ECU 200D by using the authentication information acquired from the server 181 (step S112).

Next, when the relay device 100 has failed in the intra-vehicular authentication process regarding the in-vehicle ECU 200D (YES in step S114), the relay device 100 stops relay of information between the in-vehicle ECU 200D and another in-vehicle ECU 200 (step S116).

Next, the relay device 100 acquires new authentication information of the in-vehicle ECU 200D from the server 181 (step S104).

Meanwhile, when the relay device 100 has succeeded in the intra-vehicular authentication process regarding the in-vehicle ECU 200D (NO in step S114), the relay device 100 starts or continues relay of information between the in-vehicle ECU 200D and another in-vehicle ECU 200 (step S118).

Next, when the validity time limit of the authentication information of the in-vehicle ECU 200D has not expired (NO in step S120), the relay device 100 performs, at the timing of the next intra-vehicular authentication process, the intra-vehicular authentication process regarding the in-vehicle ECU 200D by using the authentication information (step S112).

Meanwhile, when the validity time limit of the authentication information of the in-vehicle ECU 200D has expired (YES in step S120), the relay device 100 confirms whether or not the state is a state where communication with the server 181 is possible (step S122).

Next, when the state is a state where communication with the server 181 is possible (YES in step S122) and the vehicle 1 is not traveling (YES in step S124), the relay device 100 acquires new authentication information of the in-vehicle ECU 200D from the server 181 (step S104).

Meanwhile, when the state is a state where communication with the server 181 is not possible (NO in step S122) or when the state is a state where communication with the server 181 is possible (YES in step S122) and the vehicle 1 is traveling (NO in step S124), the relay device 100 performs an extension process (step S126).

Next, at the timing of the next intra-vehicular authentication process, the relay device 100 performs the intra-vehicular authentication process regarding the in-vehicle ECU 200D by using extended authentication information being the authentication information of which the validity has been maintained by the extension process (step S112).

Figure 6:
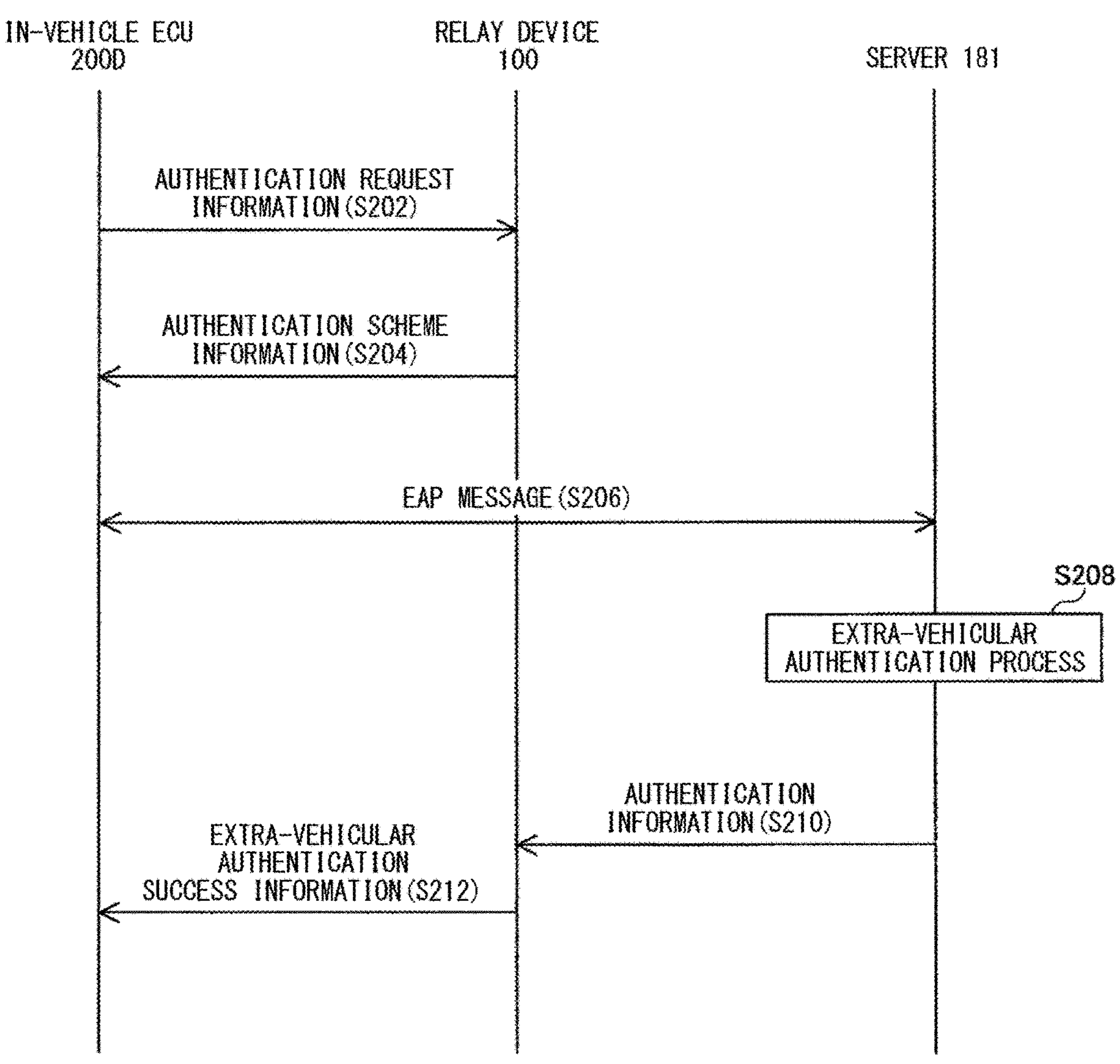
FIG. 6 shows an example of a sequence of an extra-vehicular authentication process performed in the communication system according to the embodiment of the present disclosure.

FIG. 6 shows an example of a sequence of an extra-vehicular authentication process performed in the communication system according to the embodiment of the present disclosure.

With reference to FIG. 6, first, when the in-vehicle ECU 200D serving as a new function unit newly added to the in-vehicle network 12 has been connected to the relay device 100, the in-vehicle ECU 200D transmits, to the relay device 100, authentication request information including the MAC address of the in-vehicle ECU 200D (step S202).

Next, when having received the authentication request information from the in-vehicle ECU 200D, the relay device 100 transmits, to the in-vehicle ECU 200D, authentication scheme information indicating an authentication scheme to be used in the extra-vehicular authentication process (step S204).

Next, the in-vehicle ECU 200D and the server 181 send and receive, via the relay device 100, an EAP message that includes information necessary for the extra-vehicular authentication process (step S206).

Next, the server 181 performs the extra-vehicular authentication process regarding the in-vehicle ECU 200D by using the EAP message received from the in-vehicle ECU 200 via the relay device 100 (step S208).

Next, when the server 181 has succeeded in authentication of the in-vehicle ECU 200D through the extra-vehicular authentication process, the server 181 generates authentication information that indicates an authentication success, and transmits the generated authentication information to the relay device 100 (step S210).

Next, upon receiving the authentication information from the server 181, the relay device 100 transmits extra-vehicular authentication success information to the in-vehicle ECU 200D (step S212).

Figure 7:
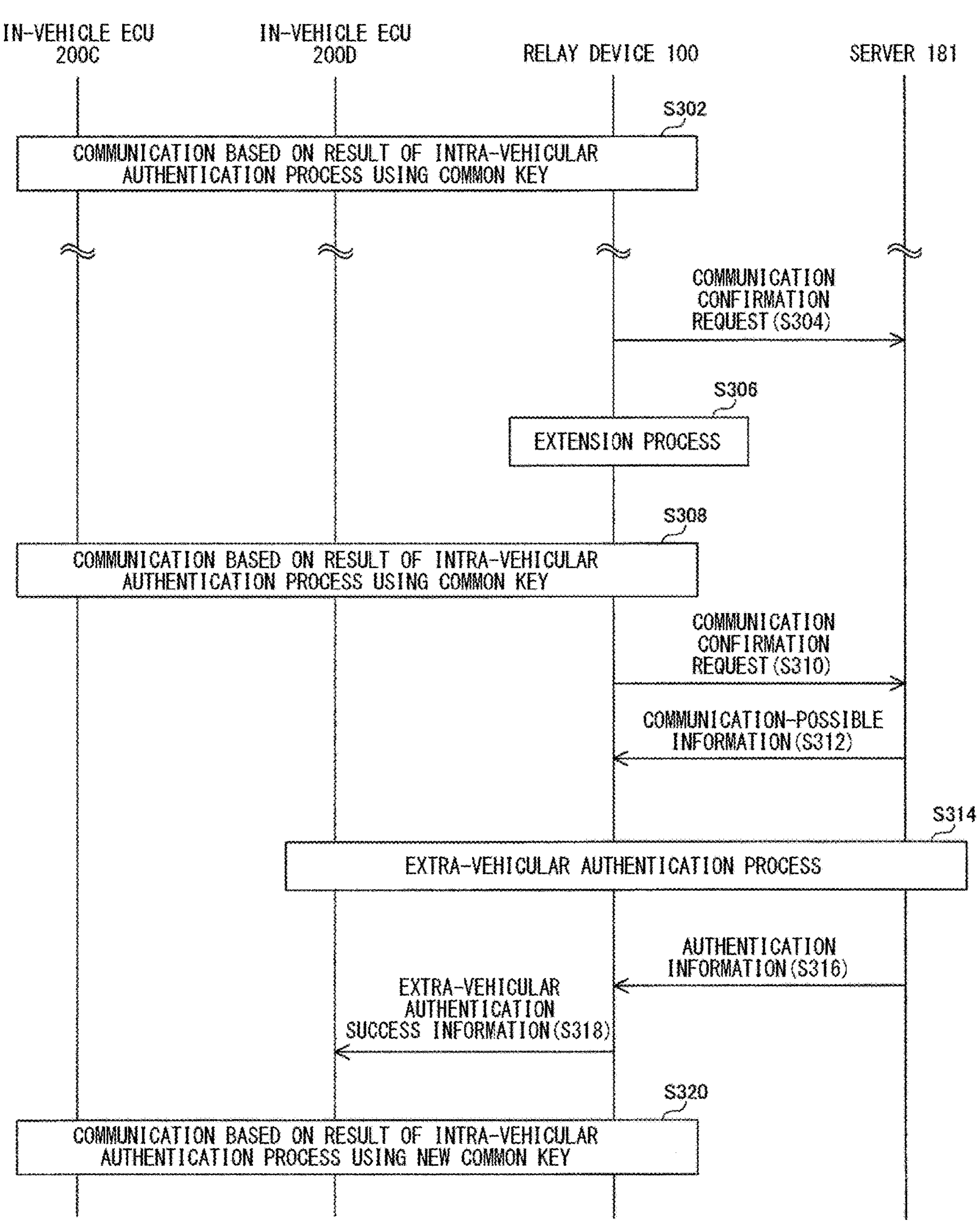
FIG. 7 shows an example of a sequence of an extra-vehicular authentication process and an intra-vehicular authentication process performed in the communication system according to the embodiment of the present disclosure.

FIG. 7 shows an example of a sequence of an extra-vehicular authentication process and an intra-vehicular authentication process performed in the communication system according to the embodiment of the present disclosure.

With reference to FIG. 7, first, the relay device 100 is relaying information between the in-vehicle ECU 200C and the in-vehicle ECU 200D on the basis of a result of an intra-vehicular authentication process using a common key. That is, the in-vehicle ECU 200C and the in-vehicle ECU 200D are communicating with each other via the relay device 100 on the basis of the result of the intra-vehicular authentication process performed by the relay device 100 (step S302).

Next, when the validity time limit of authentication information of the in-vehicle ECU 200D has expired, the relay device 100 transmits a communication confirmation request to the server 181 (step S304).

Next, when the relay device 100 has not been able to receive communication-possible information from the server 181 within a predetermined time from the transmission of the communication confirmation request, the relay device 100 determines that the state is a state where the relay device 100 and the server 181 cannot communicate with each other, and performs an extension process of maintaining the validity of the authentication information including the common key (step S306).

Next, the relay device 100 continues relay of information between the in-vehicle ECU 200C and the in-vehicle ECU 200D based on the result of the intra-vehicular authentication process using the common key. Then, on the basis of the result of the intra-vehicular authentication process performed by the relay device 100, the in-vehicle ECU 200C and the in-vehicle ECU 200D perform communication with each other via the relay device 100 (step S308).

Next, the relay device 100 transmits again a communication confirmation request to the server 181 (step S310).

Next, upon receiving the communication confirmation request, the server 181 transmits, to the relay device 100, communication-possible information as a response to the communication confirmation request (step S312).

Next, the in-vehicle ECU 200D and the server 181 send and receive, via the relay device 100, an EAP message that includes information necessary for the extra-vehicular authentication process. Then, the server 181 performs the extra-vehicular authentication process regarding the in-vehicle ECU 200D by using the EAP message received from the in-vehicle ECU 200 via the relay device 100 (step S314).

Next, when the server 181 has succeeded in authentication of the in-vehicle ECU 200D through the extra-vehicular authentication process, the server 181 generates authentication information that includes a new common key, and transmits the generated authentication information to the relay device 100 (step S316).

Next, upon receiving the authentication information including the new common key from the server 181, the relay device 100 transmits, to the in-vehicle ECU 200D, extra-vehicular authentication success information that includes the new common key (step S318).

Next, the relay device 100 starts relay of information between the in-vehicle ECU 200C and the in-vehicle ECU 200D based on the result of an intra-vehicular authentication process using the new common key. Then, on the basis of the result of the intra-vehicular authentication process performed by the relay device 100, the in-vehicle ECU 200C and the in-vehicle ECU 200D perform communication with each other via the relay device 100 (step S320).

Figure 8:
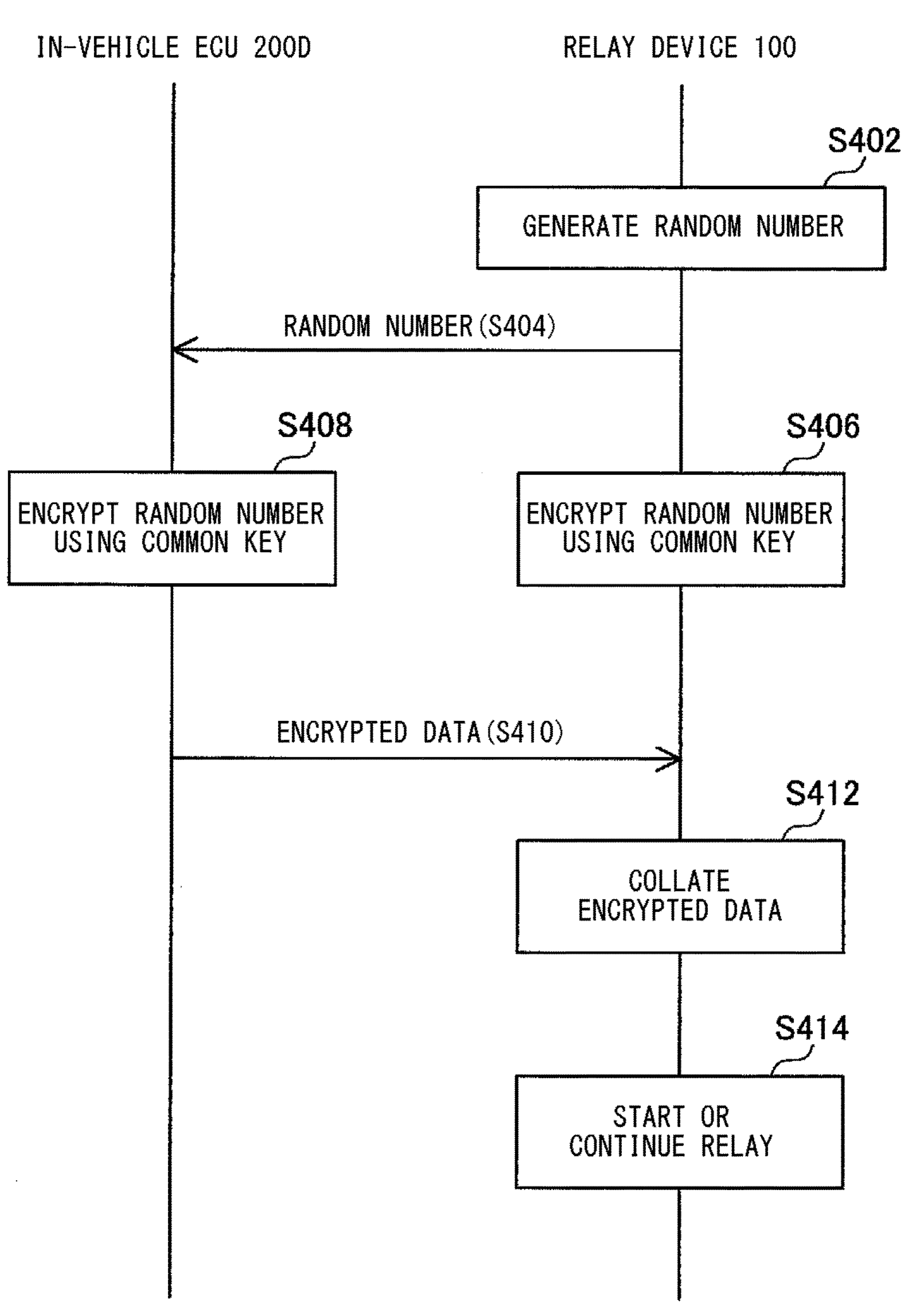
FIG. 8 shows an example of a sequence of the intra-vehicular authentication process performed in the communication system according to the embodiment of the present disclosure.

FIG. 8 shows an example of a sequence of the intra-vehicular authentication process performed in the communication system according to the embodiment of the present disclosure. FIG. 8 shows details of the processes in steps S302, S308, S320 in FIG. 7.

With reference to FIG. 8, first, the relay device 100 generates a random number (step S402).

Next, the relay device 100 transmits the generated random number to the in-vehicle ECU 200D serving as the target of the intra-vehicular authentication process (step S404).

Next, the relay device 100 encrypts the generated random number by using a common key, to generate encrypted data (step S406).

The in-vehicle ECU 200D encrypts the random number received from the relay device 100, by using the common key, to generate encrypted data (step S408).

Next, the in-vehicle ECU 200D transmits the generated encrypted data to the relay device 100 (step S410).

Upon receiving the encrypted data from the in-vehicle ECU 200D, the relay device 100 collates the received encrypted data with the encrypted data generated by the relay device 100 (step S412).

Next, when the encrypted data received from the in-vehicle ECU 200D matches the encrypted data generated by the relay device 100, the relay device 100 determines that the intra-vehicular authentication process regarding the in-vehicle ECU 200D has been successful, and starts or continues relay of information between the in-vehicle ECU 200D and another in-vehicle ECU 200 (step S414).

Figure 9:
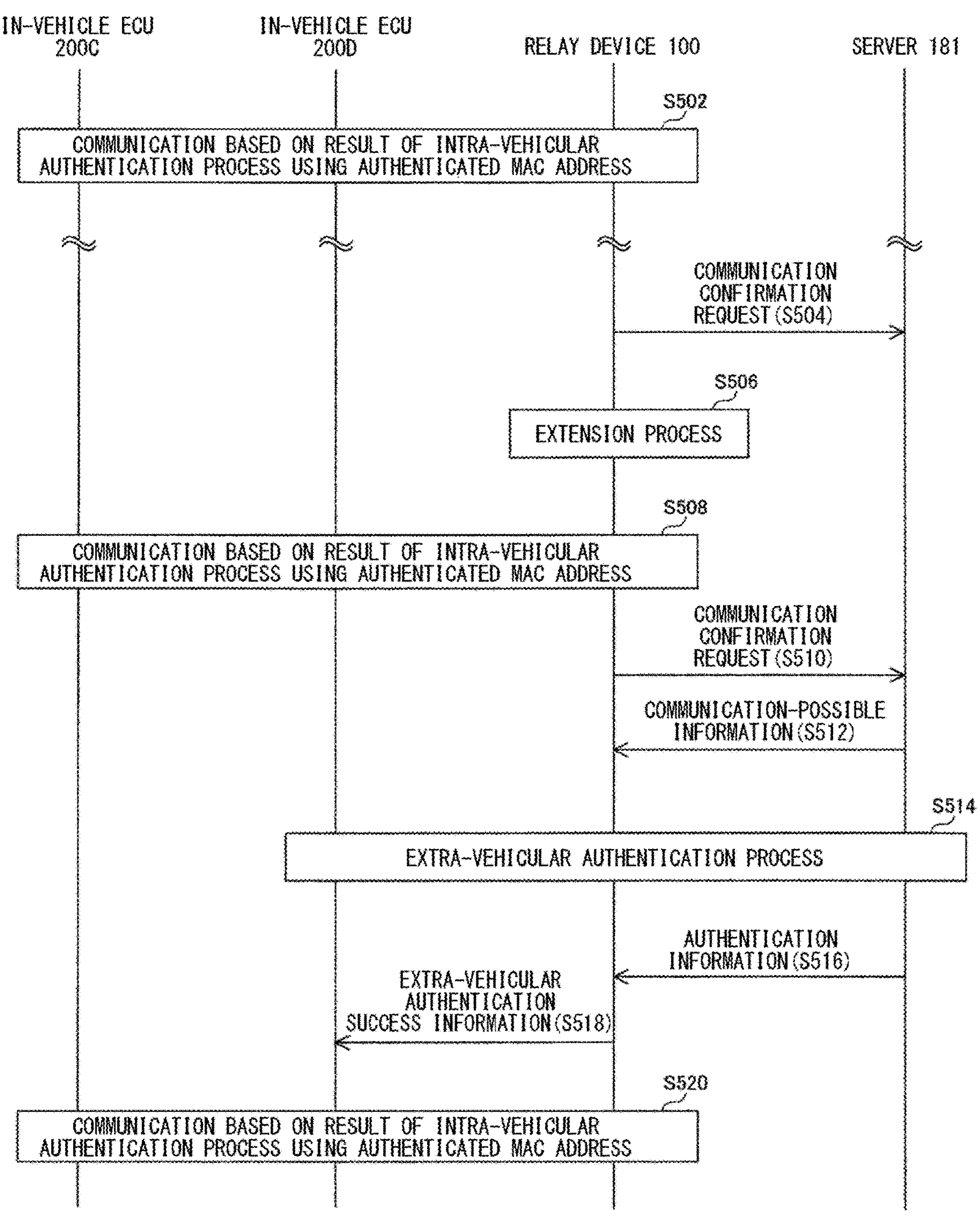
FIG. 9 shows another example of a sequence of the extra-vehicular authentication process and the intra-vehicular authentication process performed in the communication system according to the embodiment of the present disclosure.

FIG. 9 shows another example of a sequence of the extra-vehicular authentication process and the intra-vehicular authentication process performed in the communication system according to the embodiment of the present disclosure.

With reference to FIG. 9, first, the relay device 100 is relaying information between the in-vehicle ECU 200C and the in-vehicle ECU 200D on the basis of a result of an intra-vehicular authentication process using an authenticated MAC address. That is, the in-vehicle ECU 200C and the in-vehicle ECU 200D are communicating with each other via the relay device 100 on the basis of the result of the intra-vehicular authentication process performed by the relay device 100 (step S502).

Next, when the validity time limit of authentication information of the in-vehicle ECU 200D has expired, the relay device 100 transmits a communication confirmation request to the server 181 (step S504).

Next, when the relay device 100 has not been able to receive communication-possible information from the server 181 within a predetermined time from the transmission of the communication confirmation request, the relay device 100 determines that the state is a state where the relay device 100 and the server 181 cannot communicate with each other, and performs an extension process of maintaining the validity of the authentication information including the authenticated MAC address (step S506).

Next, the relay device 100 continues relay of information between the in-vehicle ECU 200C and the in-vehicle ECU 200D based on the result of the intra-vehicular authentication process using the authenticated MAC address. Then, on the basis of the result of the intra-vehicular authentication process performed by the relay device 100, the in-vehicle ECU 200C and the in-vehicle ECU 200D perform communication with each other via the relay device 100 (step S508).

Next, the relay device 100 transmits again a communication confirmation request to the server 181 (step S510).

Next, upon receiving the communication confirmation request, the server 181 transmits, to the relay device 100, communication-possible information as a response to the communication confirmation request (step S512).

Next, the in-vehicle ECU 200D and the server 181 send and receive, via the relay device 100, an EAP message that includes information necessary for the extra-vehicular authentication process. Then, the server 181 performs the extra-vehicular authentication process regarding the in-vehicle ECU 200D by using the EAP message received from the in-vehicle ECU 200 via the relay device 100 (step S514).

Next, when the server 181 has succeeded in authentication of the in-vehicle ECU 200D through the extra-vehicular authentication process, the server 181 transmits, to the relay device 100, new authentication information that includes an authenticated MAC address (step S516).

Next, upon receiving the new authentication information from the server 181, the relay device 100 transmits, to the in-vehicle ECU 200D, extra-vehicular authentication success information that includes the authenticated MAC address that corresponds to the received authentication information (step S518).

Next, the relay device 100 starts relay of information between the in-vehicle ECU 200C and the in-vehicle ECU 200D based on the result of an intra-vehicular authentication process using the new authenticated MAC address. Then, on the basis of the result of the intra-vehicular authentication process performed by the relay device 100, the in-vehicle ECU 200C and the in-vehicle ECU 200D perform communication with each other via the relay device 100 (step S520).

In the relay device 100 according to the embodiment of the present disclosure, when the validity time limit of the authentication information has expired and the relay device 100 cannot communicate with the server 181, the authentication processing unit 140 performs an extension process of maintaining the validity of the authentication information, and performs an intra-vehicular authentication process regarding the corresponding in-vehicle ECU 200 by using extended authentication information being the authentication information of which the validity has been maintained. However, the present disclosure is not limited thereto. When the validity time limit of the authentication information has expired and the relay device 100 cannot communicate with the server 181, the authentication processing unit 140 may stop the intra-vehicular authentication process until acquiring new authentication information, without performing the extension process. Alternatively, the relay processing unit 120 may stop relay of information between in-vehicle ECUs 200 until the authentication processing unit 140 acquires new authentication information and performs an intra-vehicular authentication process by using the acquired new authentication information.

In the relay device 100 according to the embodiment of the present disclosure, the relay processing unit 120 determines, in accordance with the type of the in-vehicle ECU 200, the content of information that should be relayed when the authentication process using extended authentication information by the authentication processing unit 140 has been successful. However, the present disclosure is not limited thereto. Irrespective of the type of the in-vehicle ECU 200, the relay processing unit 120 may relay all information including various types of content between the in-vehicle ECU 200 and another in-vehicle ECU 200 when the authentication process using extended authentication information by the authentication processing unit 140 has been successful.

In the relay device 100 according to the embodiment of the present disclosure, the relay processing unit 120 determines, in accordance with the type of information received from an in-vehicle ECU 200, whether or not to perform relay when the authentication process using extended authentication information by the authentication processing unit 140 has been successful. However, the present disclosure is not limited thereto. Irrespective of the type of information received from the in-vehicle ECU 200, the relay processing unit 120 may relay all information received from the in-vehicle ECU 200 and addressed to another in-vehicle ECU 200.

In the relay device 100 according to the embodiment of the present disclosure, the authentication processing unit 140 acquires, from the server 181, authentication information of which the common key is updated every time the authentication information is acquired. However, the present disclosure is not limited thereto. Every time the server 181 performs an extra-vehicular authentication process and succeeds in authentication, the server 181 may generate corresponding authentication information that includes the same common key, and transmit the generated authentication information to the relay device 100.

In the relay device 100 according to the embodiment of the present disclosure, when the vehicle 1 is traveling in a state where communication between the relay device 100 and the server 181 is possible and where the validity time limit of the authentication information has expired, the authentication processing unit 140 performs the extension process of maintaining the validity of the authentication information without acquiring new authentication information from the server 181. However, the present disclosure is not limited thereto. Irrespective of whether or not the vehicle 1 is traveling in a state where communication between the relay device 100 and the server 181 is possible and where the validity time limit of the authentication information has expired, the authentication processing unit 140 may acquire new authentication information from the server 181.

Meanwhile, a technology that can improve security in in-vehicle networks is desired.

Specifically, for example, in a case where a new in-vehicle network is configured by mounting a new in-vehicle ECU to an existing in-vehicle network, a technology that can improve security in the new in-vehicle network is desired.

In this regard, the relay device 100 according to the embodiment of the present disclosure is mounted to the vehicle 1 including a plurality of in-vehicle ECUs 200. The authentication processing unit 140 acquires authentication information of an in-vehicle ECU 200 from the server 181 outside the vehicle 1 and performs an authentication process regarding the in-vehicle ECU 200 by using the acquired authentication information. On the basis of the result of the authentication process performed by the authentication processing unit 140, the relay processing unit 120 relays information between the in-vehicle ECU 200 and another in-vehicle ECU 200. When the validity time limit of the authentication information has expired, the authentication processing unit 140 acquires new authentication information from the server 181.

Thus, with the configuration in which authentication information of an in-vehicle ECU 200 is acquired from the server 181 outside the vehicle 1, even when a new unknown in-vehicle ECU 200 has been added to the in-vehicle network, the authentication information of the in-vehicle ECU can be acquired. Further, when the validity time limit has expired, new authentication information is acquired, the authentication process regarding the in-vehicle ECU 200 is performed by using the acquired authentication information, and on the basis of the result of the authentication process, information between the in-vehicle ECU 200 and another in-vehicle ECU 200 is relayed. With this configuration, security in the in-vehicle network can be ensured. In addition, even in a situation where it is difficult to acquire new authentication information from the server 181 due to the traveling environment of the vehicle 1, the authentication process regarding the in-vehicle ECU 200 can be performed by continuously using the authentication information.

Therefore, in the relay device 100 according to the embodiment of the present disclosure, security in the in-vehicle network can be improved.

In the relay device 100 according to the embodiment of the present disclosure, when the validity time limit of the authentication information has expired and the relay device 100 cannot communicate with the server 181, the authentication processing unit 140 performs an extension process of maintaining the validity of the authentication information, and performs, by using extended authentication information being the authentication information of which the validity has been maintained, an authentication process regarding the in-vehicle ECU 200 corresponding to the authentication information.

With this configuration, even in a case where, when the validity time limit of the authentication information has expired, the communication environment between the relay device 100 and the server 181 is bad due to the traveling environment of the vehicle 1 and new authentication information cannot be acquired, it is possible to perform an authentication process and continue relay of information between in-vehicle ECUs 200 based on the authentication result. Accordingly, for example, in a configuration in which security is improved by updating the content of the authentication information at the outside of the vehicle 1, it is possible to manage stable communication in the in-vehicle network, irrespective of the traveling environment of the vehicle 1.

In the relay device 100 according to the embodiment of the present disclosure, the relay processing unit 120 determines, in accordance with the type of the in-vehicle ECU 200, the content of information that should be relayed when the authentication process using extended authentication information by the authentication processing unit 140 has been successful.

With this configuration, a part of information to be relayed when the extension process has been performed can be restricted in accordance with the type of the in-vehicle ECU 200. Therefore, for example, by continuing relay of information between in-vehicle ECUs 200 that will influence traveling of the vehicle 1, and at the same time, by stopping relay of information between in-vehicle ECUs 200 that will not influence traveling of the vehicle 1, it is possible to suppress decrease in security in the in-vehicle network while maintaining favorable traveling of the vehicle 1.

In the relay device 100 according to the embodiment of the present disclosure, the relay processing unit 120 determines, in accordance with the type of information received from the in-vehicle ECU 200, whether or not to perform relay when the authentication process using extended authentication information by the authentication processing unit 140 has been successful.

With this configuration, a part of information to be relayed when the extension process has been performed can be restricted in accordance with the type of information received from the in-vehicle ECU 200. Therefore, for example, by continuing relay of information that will influence traveling of the vehicle 1, and at the same time, by stopping relay of information that will not influence traveling of the vehicle 1, it is possible to suppress decrease in security in the in-vehicle network while maintaining favorable traveling of the vehicle 1.

In the relay device 100 according to the embodiment of the present disclosure, the authentication processing unit 140 acquires, from the server 181, authentication information that has a content that is different every time the authentication information is acquired.

With this configuration, every time the validity time limit has expired, authentication information that has a new content can be acquired, and an authentication process regarding the in-vehicle ECU 200 can be performed by using the authentication information. Therefore, security in the in-vehicle network can be further improved.

In the relay device 100 according to the embodiment of the present disclosure, when the vehicle 1 is traveling in a state where communication between the relay device 100 and the server 181 is possible and where the validity time limit of the authentication information has expired, the authentication processing unit 140 performs an extension process of maintaining the validity of the authentication information without acquiring new authentication information from the server 181.

With this configuration, for example, a situation where an authentication error occurs as a result of performing an authentication process by using new authentication information, and relay of a part or all of information between in-vehicle ECUs 200 is stopped during traveling of the vehicle 1, can be avoided. Thus, favorable traveling of the vehicle 1 can be maintained.

A vehicle communication method according to an embodiment of the present disclosure is performed in the relay device 100 mounted to the vehicle 1 including a plurality of in-vehicle ECUs 200. In this vehicle communication method, first, authentication information of an in-vehicle ECU 200 is acquired from an external device outside the vehicle 1. Next, an authentication process regarding the in-vehicle ECU 200 is performed by using the acquired authentication information. Next, on the basis of the result of the authentication process, information between the in-vehicle ECU 200 and another in-vehicle ECU 200 is relayed. Next, when the validity time limit of the authentication information has expired, new authentication information is acquired from the server 181.

Thus, with the method in which authentication information of an in-vehicle ECU 200 is acquired from the server 181 outside the vehicle 1, even when a new unknown in-vehicle ECU 200 has been added to the in-vehicle network, the authentication information of the in-vehicle ECU can be acquired. Further, when the validity time limit has expired, new authentication information is acquired, the authentication process regarding the in-vehicle ECU 200 is performed by using the acquired authentication information, and on the basis of the result of the authentication process, information between the in-vehicle ECU 200 and another in-vehicle ECU 200 is relayed. With this method, security in the in-vehicle network can be ensured. In addition, even in a situation where it is difficult to acquire new authentication information from the server 181 due to the traveling environment of the vehicle 1, the authentication process regarding the in-vehicle ECU 200 can be performed by continuously using the authentication information.

Therefore, with the vehicle communication method according to the embodiment of the present disclosure, security in the in-vehicle network can be improved.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional note below.

[Additional Note 1]

A relay device mounted to a vehicle including a plurality of function units, the relay device comprising:

an authentication processing unit configured to acquire authentication information of a function unit from an external device outside the vehicle, and perform an authentication process regarding the function unit by using the acquired authentication information; and a relay processing unit configured to, on the basis of a result of the authentication process performed by the authentication processing unit, relay information between the function unit and another function unit, wherein when a validity time limit of the authentication information has expired, the authentication processing unit acquires, from the external device, the authentication information that is new, and the authentication processing unit acquires, from the external device, the authentication information that includes a common key that is different every time the authentication information is acquired, and the authentication processing unit performs an authentication process regarding the function unit by using the common key included in the acquired authentication information.

REFERENCE SIGNS LIST

1 vehicle
11 external network
12 in-vehicle network
13 Ethernet cable
52 communication port
100 relay device
110 communication unit
120 relay processing unit
130 detection unit
140 authentication processing unit
150 storage unit
160 timer
161 wireless base station device
181 server
200 in-vehicle ECU
210 communication unit
220 processing unit
230 authentication request unit
240 storage unit
301 in-vehicle communication system
401 communication system

The invention claimed is:

1. A relay device mounted to a vehicle including a plurality of function units, the relay device comprising:

an authentication processing unit configured to acquire, from an external device outside the vehicle, first authentication information including a success result or a failure result of a first extra-vehicular authentication process for a first function unit of the plurality of function units, and perform a first intra-vehicular authentication process regarding the first function unit by using the acquired first authentication information; and a relay processing unit configured to, on the basis of a result of the first intra-vehicular authentication process performed by the authentication processing unit, relay information between the first function unit and a second function unit of the plurality of function units, wherein in response to a validity time limit of the first authentication information having expired, the authentication processing unit acquires, from the external device, second authentication information including a success result or a failure result of a second extra-vehicular authentication process for the first function unit.

2. The relay device according to claim 1, wherein when the validity time limit of the first authentication information has expired and the relay device is not able to communicate with the external device, the authentication processing unit performs an extension process of maintaining validity of the first authentication information, and performs, by using extended authentication information being the first authentication information of which the validity has been maintained, a second intra-vehicular authentication process regarding the first function unit corresponding to the first authentication information.

3. The relay device according to claim 2, wherein the relay processing unit determines, in accordance with a type of the first function unit, a content of information that should be relayed when the second intra-vehicular authentication process using the extended authentication information by the authentication processing unit has been successful.

4. The relay device according to claim 2, wherein the relay processing unit determines, in accordance with a type of information received from the first function unit, whether or not to perform relay when the second intra-vehicular authentication process using the extended authentication information by the authentication processing unit has been successful.

5. The relay device according to claim 1, wherein the authentication processing unit acquires, from the external device, the first authentication information that has a content that is different every time the first authentication information is acquired.

6. The relay device according to claim 1, wherein when the vehicle is traveling in a state where communication between the relay device and the external device is possible and where the validity time limit of the first authentication information has expired, the authentication processing unit performs an extension process of maintaining validity of the first authentication information without acquiring the second authentication information from the external device.

7. A vehicle communication method to be performed in a relay device mounted in a vehicle including a plurality of function units, the vehicle communication method comprising the steps of:

acquiring, from an external device outside the vehicle, first authentication information including a success result or a failure result of a first extra-vehicular authentication process for a first function unit of the plurality of function units;

performing a first intra-vehicular authentication process regarding the function unit by using the acquired first authentication information;

relaying, on the basis of a result of the first intra-vehicular authentication process, information between the first function unit and a second function unit of the plurality of function units; and acquiring, in response to a validity time limit of the first authentication information having expired, second authentication information including a success result or a failure result of a second extra-vehicular authentication process for the first function unit, from the external device.

8. A non-transitory computer readable storage medium storing a computer program to be executed by a relay device mounted in a vehicle including a plurality of function units, the computer program causing a computer to perform the steps of:

acquiring, from an external device outside the vehicle, first authentication information including a success result or a failure result of a first extra-vehicular authentication process for a first function unit of the plurality of function units;

performing a first intra-vehicular authentication process regarding the function unit by using the acquired first authentication information;

relaying, on the basis of a result of the first intra-vehicular authentication process, information between the first function unit and a second function unit of the plurality of function units; and acquiring, in response to a validity time limit of the first authentication information having expired, second authentication information including a success result or a failure result of a second extra-vehicular authentication process for the first function unit, from the external device.

* * * * *